United States Patent [19]
Cracolice

[11] 3,794,355
[45] Feb. 26, 1974

[54] EXPANSION TRAILER HITCH
[76] Inventor: William N. Cracolice, 1832 Galveston, San Diego, Calif. 92110
[22] Filed: Oct. 1, 1971
[21] Appl. No.: 185,702

[52] U.S. Cl.............................. 280/482, 280/491 D
[51] Int. Cl............................................. B60d 1/00
[58] Field of Search...280/491 R, 491 B, 491 D, 482, 280/478 R, 458, 460; 214/390

[56] References Cited
UNITED STATES PATENTS
| | | | |
|---|---|---|---|
| 2,830,829 | 4/1958 | Gensinger | 280/491 R |
| 3,367,675 | 2/1968 | Gearin | 280/460 R |
| 3,572,765 | 3/1971 | Tieben | 280/491 D |

Primary Examiner—Leo Friaglia
Assistant Examiner—Randall A. Schrecengost
Attorney, Agent, or Firm—Brown and Martin

[57] ABSTRACT
An expansion trailer hitch for use in towing a vehicle at either an extended position or a normal position. The hitch has particular applicability to the launching of small boats and enables the launching vehicle to back the boat into a sufficient depth of water to float the boat off the trailer, without the launching vehicle becoming itself immersed in the water to a significant depth. The hitch is normally secured to the towing vehicle and mounts a standard hitch ball to cooperate with the hitch tongue on a trailer. The distance between the towing vehicle and the trailer is increased by disconnecting the hitch ball and allowing it to be extended through the use of expansion links attached to the towed vehicle at one end thereof and to the hitch ball mount at the other end. The expansion links comprise elongated members hinged at the mid-point of the expansion links. They are maintained in their expanded condition by an expansion lock comprising expansion bars connecting the two elongated members or a tie bar connecting adjacent expansion links. A caster is provided under the hitch ball to support the trailer and provide better tracking.

11 Claims, 7 Drawing Figures

PATENTED FEB 26 1974
3,794,355
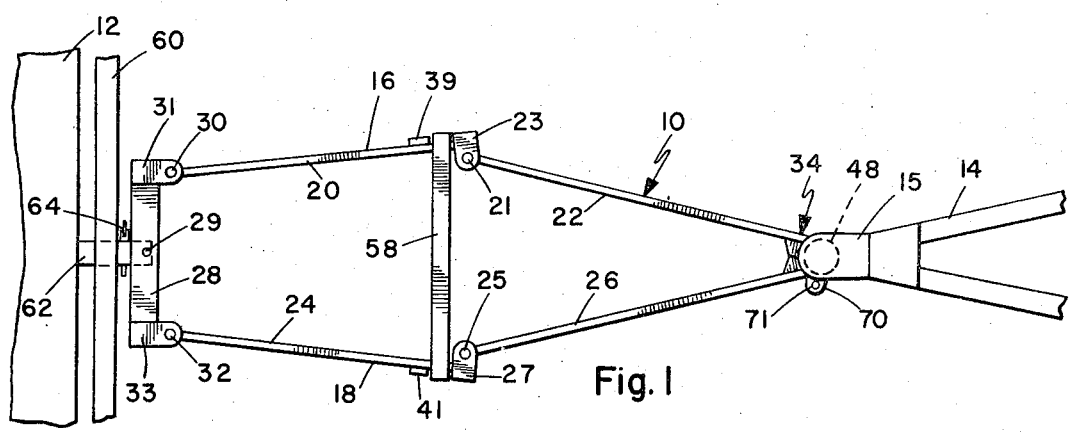
Fig. 1
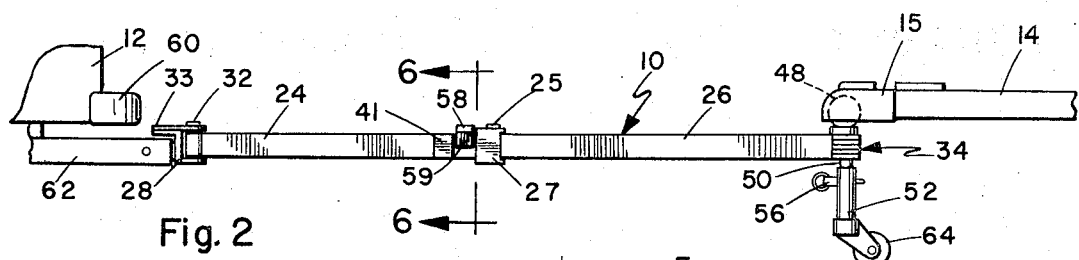
Fig. 2
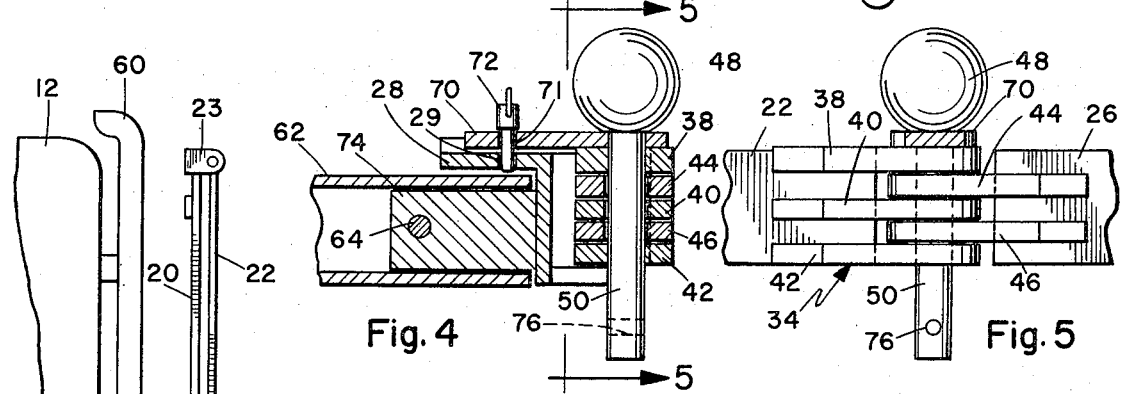
Fig. 4    Fig. 5
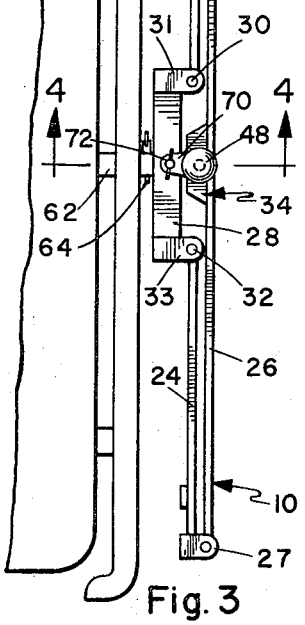
Fig. 3
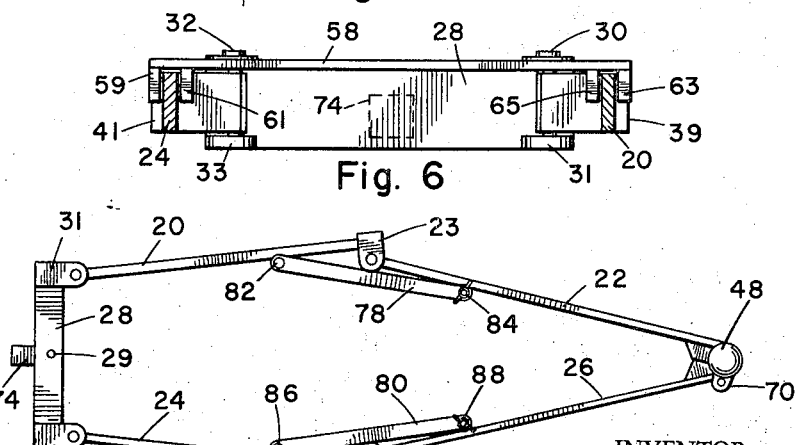
Fig. 6
Fig. 7
INVENTOR.
WILLIAM N. CRACOLICE
BY Brown & Martin
ATTORNEYS

EXPANSION TRAILER HITCH

BACKGROUND OF THE INVENTION

In the launching of boats, particularly when the boats are to be launched from shallow ramps or unprepared areas, it is frequently necessary to back the launching vehicle into the water, at least until a substantial portion of the rear wheels of the vehicle are submerged. The resultant wetting of the underside of the vehicle, and particularly the brakes and other mechanical parts, results in malfunctions after the vehicle exits the water, such as poor braking efficiency. The immersion also increases the corrosion problem, especially where the launching has taken place in salt water. An additional problem, which is particularly critical in unprepared ramps, is the possibility of the vehicle becoming mired in the mud bottom and being unable to move away under its own power. This problem is particularly critical with incoming tides.

Various extendable devices for mounting on a trailer have been proposed, whereby the launching vehicle could be spaced from the trailer an increased distance during the launching operation, to avoid the vehicle being exposed to the water. These devices have been difficult to operate and produce undesirable trailing characteristics. They therefore have not found wide usage. Further, these trailer extension devices are functional only for the particular trailer they are mounted on, and the launching vehicle is unprotected when launching other unequipped trailers.

Therefore, it would be desirable if an extendable trailer hitch could be developed, which hitch was adaptable for mounting on the towing and launching vehicle, and was easily extended to a position to space the towing and towed vehicle by a sufficient distance to obviate the necessity of the towing vehicle immersed in the water during the launching operation. This development would be particularly desirable if such an expansion hitch could be developed that produced desirable trailer backing characteristics and was of sufficient strength, and sufficiently low cost, to make its manufacture and use practical.

SUMMARY OF THE INVENTION

An exemplary embodiment of the invention comprises an expansion trailer hitch utilizing a pair of first and second expansion links, connected at one end to the towing vehicle, and at the other end to the towed vehicle. The expansion links comprise first and second elongated members hinged together, to fold on one another in the retracted position, but to be extended to a substantially aligned position. The members may be locked in both the retracted and the extended positions.

The hitch is connected to the vehicle bumper or hitch structure through a mounting bar means. The mounting bar means also contains the hinge points for hingedly mounting the first elongated members at spaced apart points along the mounting bar. The extended ends of the second elongated members are joined in a single hinge point at the towed vehicle connection means. The towed vehicle connection means comprises a hitch ball mounting means to carry the hitch ball and to provide a point of attachment for a caster wheel, located directly under the hitch ball.

The hinges between the first and second members are arranged so that the members may not be extended beyond their substantially aligned position to avoid any tendency of the hinge to go "over center."

The first embodiment of the expansion link lock means comprises a tie bar extending between opposite ones of the first elongated members to prevent the members from moving toward the retracted position. The second embodiment of the expansion link lock means comprises a pair of expansion bars that extend between the first and second members to produce a rigid connection.

In the normal or retracted position, the relative position of the members is retained by a lock that secures the hitch ball mounting means to the mounting bar, thereby preventing extension of the expansion links.

With the hitch of the invention in its normal or retracted position, the towing of a vehicle is entirely conventional, and the hitch structure is sufficiently strong so as to allow towing of any conventional trailer. In the launching phase of the hitch's operation, the vehicle would normally be backed down a portion of the ramp with the hitch in the retracted position, and then the vehicle brought to a stop. The caster wheel is placed under hitch pin to support the trailer tongue. The extension of the hitch could be accomplished in a number of ways, for example, the trailer wheels may be blocked and the towing vehicle pulled forward, or a block and tackle, or similar winch utilized to allow the trailer to controllably move back under the influence of the ramps slope, to the fully extended position. The towed vehicle would then be spaced a considerable distance, for example on the order of 6 feet, beyond its normally towed position, and this distance is normally sufficient to allow the boat to be backed into the water a sufficient depth to float it off the trailer or otherwise make it possible to launch, with the towing vehicles rear wheels still on dry pavement. The provision of a caster causes the trailer to track true during backing with no tendency to veer off to one side or the other, and making the trailer responsive to turning movements from the towing vehicle.

It is therefore an object of the invention to provide a new and improved expansion trailer hitch.

It is another object of the invention to provide a new and improved expansion trailer hitch for use in the launching of boats.

It is another object of the invention to provide a new and improved expansion trailer hitch that reduces the damage to the towing vehicle occasioned by launching operations.

It is another object of the invention to provide a new and improved expansion trailer hitch which is low in cost and easy to manufacture.

It is another object of the invention to provide a new and improved expansion trailer hitch which is high in strength in both the normal and extended positions.

It is another object of the invention to provide a new and improved expansion trailer hitch that exhibits good backing characteristics.

It is another object of the invention to provide a new and improved expansion trailer hitch that does not present an objectionable obstruction when in the retracted position.

It is another object of the invention to provide a new and improved expansion trailer hitch that is simple to operate.

Other objects and many attendant advantages of the invention will become more apparent upon a reading of the following detailed description together with the drawings, in which like reference numerals refer to like parts throughout, and in which:

FIG. 1 is a top plan view of the boat launching hitch in its extended position.

FIG. 2 is a side elevation view of the extended hitch.

FIG. 3 is a top plan view of the hitch in its retracted position.

FIG. 4 is an enlarged sectional view taken on line 4—4 of FIG. 3.

FIG. 5 is a sectional view taken on line 5—5 of FIG. 4.

FIG. 6 is an enlarged sectional view taken on line 6—6 of FIG. 2.

FIG. 7 is a top plan view of the extended hitch with an alternative locking arrangement.

Referring now to the drawings, there is illustrated generally an expansion trailer hitch 10 according to the invention. The hitch is secured at its one end to a vehicle 12 and at the opposite end to a trailer 14.

The hitch apparatus is illustrated as comprising first and second expansion lengths 16 and 18. The expansion length 16 comprises first elongated member 20 hingedly secured to a second elongated member 22. The hinge is illustrated as comprising a U-shaped bracket 23 and a hinge pin 21. Similarly, the second expansion length 18 is illustrated as comprising a first elongated member 24 hingedly connected to a second elongated member 26. The hinge connection comprises a U-shaped bracket 27 secured to the first elongated member 24 and a hinge pin 25 secured to the second elongated member 26.

The elongated members are illustrated as comprising flat bar stock oriented so that its maximum strength is available to support the vertical loads imposed. This flat bar stock is particularly useful with the invention but other structural members may also be employed such as channel or tubular members.

The first elongated members are secured with their ends spaced apart to the mounting bar 28 by hinge brackets 31 and 33 through hinge pins 30 and 32. This spaced apart relationship produces a generally triangular configuration for the extended expansion hitch for purposes of obtaining the necessary rigidity. The mounting bar 28 may be secured to the vehicle bumper 60 on vehicles with sufficiently strong bumpers, such as docking bumpers on trucks, or to the conventional tubular hitch structure 62 by a plug 74 inserted in the tubular structure and pinned in place by pin 64. The invention is also adaptable to all other types of towing structures.

The towed vehicle connection means 34 is illustrated as comprising a plurality of leaves 38, 40 and 42 secured to the second elongated member 22, and a plurality of interfitting leaves 44 and 46 secured to the second elongated member 26. These leaves are connected by a hinge pin 50 which carries, at its upper end, a hitch ball 48. The pin extends below the hinge structure to provide an extension with a mounting hole 76 to be utilized with the caster wheel. The caster wheel is utilized for auxiliary support, and also to aid in the tracking capability when the hitch is in the extended position. The caster wheel comprises a freely rotatable caster wheel 64 on a caster mount 52. The mount is secured to the hinge pin extension by a pin 56 inserted through hole 76. The hinge pin 50 also mounts a locking plate 70. The plate 70 includes a locking pin receiving hole 71, which hole is oriented to rotate into alignment with a corresponding hole 29 on the mounting bar 28. When the holes are in registration, a locking pin 72 may be inserted to hold the hitch apparatus in its retracted position, and allow it to be used as a normal hitch for towing a vehicle on the highway, for example.

Referring now to FIG. 1, there is illustrated an embodiment of the extension length locking means of the invention. A tie bar 58 is placed between the first and second extension links at a point spaced toward the mounting bar from the hinges. The fore and aft position is retained by a plurality of stops 39 and 41. Rotational movement of the extension links is precluded by a set of vertical protrusions 59 and 61 on one end of the tie bar and protrusions 63 and 65 on the opposite end of the tie bar, which protrusions are received over the corresponding extension links. The tie bar is removed when it is desired to retract and close the hitch apparatus to its normal position. When installed it makes the hitch apparatus a substantially rigid structure.

A second embodiment of the extension link locking means is illustrated in FIG. 7. A plurality of locking bars 78 and 80 are pivotally secured to the first elongated members by pivots 82 and 86, and are provided with releasable pivoting points 84 and 86, on the second elongated members. When the locking bars 78 and 80 are installed between the two pivot points, they form a triangular configuration, which triangular structure is inherently rigid and therefore rigidizes the entire hitch apparatus for backing operations.

OPERATION

In use, the expansion trailer hitch apparatus of the invention would be installed on a towing vehicle such as a truck through a conventional hitch under structure directly to the vehicles under structure. The normal position of the structure for both over-the-road towing operations, and for periods of non-use, is illustrated in FIG. 3, wherein the hitch ball mounting structure is locked to the mounting bar through the use of pin 72. In this configuration, none of the trailer loads are carried by the elongated members and the loads are transferred directly through the mounting bar to the vehicle structure.

When it is desirable, for any purpose, such as when a boat is to be launched at a boat launching ramp, the expansion trailer hitch apparatus would be made ready for use in the following manner. The vehicle operator would block the wheels on the trailer, or independently secure the trailer directly to the vehicle, to prevent the trailer from moving away from the towing vehicle after release of the locking means, and would then release the locking means by pulling the pin 72. The removal of pin 72 leaves the hitch ball mounting means free to move away from the supporting bar under the guidance of the hinges joining the elongated members. The hitch ball means would be drawn out to its full extension either by allowing the trailer vehicle to drift backwards under the control of a winch, such as a block and tackle, or a power winch, until the apparatus was fully extended, or by driving the towing vehicle forward, with the trailer wheels blocked, to fully extend the hitch apparatus. The fully extended position of the apparatus is illustrated in FIG. 1. The hitch apparatus is prevented from moving over center by the hinge structure 23 and 21 which prevents rotation of the second elongated member beyond the position illustrated. After extension of the hitch apparatus, the expansion links are locked in place through the use of the expansion link locking means of either embodiment. The link locking means of FIG. 1 comprising the tie bar 58, is installed by placing it over the first elongated members between the hinge brackets and the stops, thereby locking the members against additional rotation. The second elongated members are also locked by this action, since the tie bar is in effect a base of a triangular configuration. The second embodiment of the locking means is installed by connecting the removable pivot pins 84 and 88, to again utilize the inherent rigidity of the triangular structure, and to prevent rotational movement of any one of the elongated members or the members collectively.

With the apparatus in its fully extended and locked position, it is then possible to maneuver the trailer, backing it or towing it as required, with the rigidity of the apparatus providing good control over the trailers movement. This control is facilitated and improved through the use of the caster 64, which caster may be installed on the hitch ball pin extension by fitting the caster housing 52 over the extension, and inserting pin 56. With the caster wheel installed, there is no tendency for the trailer tongue 15 to contact the ground and the placement of the pivot point for the caster wheel directly beneath the hitch ball makes the trailer extremely responsive to the control of the vehicle operator.

Thus it is possible for the operator to back a trailer carrying a boat for example, a sufficient distance into the water to float the boat from the trailer, so that it may be easily launched, without the immersion of any portion of the launching vehicle.

The operation of the apparatus of the invention in retrieving a launched boat is substantially the reverse of that previously described and it is possible to tow the boat with the hitch in the extended position a considerable distance if necessary or desirable before the hitch is retracted to its normal position and locked in place.

Having described my invention, I now claim:

1. An expansion trailer hitch to enable a towing vehicle to tow and back a towed vehicle with increased spacing between the towing vehicle and towed vehicle comprising:
    first and second expansion links attached to towed vehicle connection means at one end thereof for connection to a towed vehicle, and to tow vehicle connection means at the opposite end thereof for connection to a towing vehicle,
    said first and second expansion links comprising first and second elongated members of substantially equal length connected by link hinge means for movement of said expansion links between a normal position where said first and second members are folded on one another, and an expansion position, where said first and second members are in substantial alignment.
    expansion lock means for retaining said first and second expansion links in said expansion position, and
    said expansion lock means comprises an expansion bar means for connection between said first and said second member in the extended position of said expansion links.

2. The expansion trailer hitch of claim 1 wherein, said towing vehicle connection means comprises a mounting bar means for being secured to a towing vehicle,
    said mounting bar means comprises spaced apart hinge points for hinged connection to said first members.

3. The expansion trailer hitch of claim 2 wherein, said towed vehicle connection means comprises hitch ball mounting means for mounting a hitch ball and for connecting with said second members,
    and said hitch ball mounting means comprises unitary hinge means for connection to said second members.

4. An expansion trailer hitch to enable a towing vehicle to tow and back a towed vehicle with increased spacing between the towing vehicle and towed vehicles comprising:
    first and second expansion links attached to towed vehicle connection means at one end thereof for connection to a towed vehicle, and to tow vehicle connection means at the opposite end thereof for connection to a towing vehicle,
    said first and second expansion links comprising first and second elongated members of substantially equal length connected by a link hinge means for movement of said expansion links between a normal position where said first and second members are folded on one another, and an expansion position where said first and second members are in substantial alignment,
    said towing vehicle connection means comprises spaced apart hinge points for hinged connection to said first members,
    said mounting bar means comprises spaced apart hinge points for hinged connection to said first members,
    said towed vehicle connection means comprises hitch ball mounting means for mounting a hitch ball and for connecting with said second members,
    said hitch ball mounting means comprises unitary hitch means for connection to said second members.

5. The expansion trailer hitch of claim 4 including, expansion lock means for retaining said first and second expansion links in said expansion position.

6. The expansion trailer hitch of claim 5 wherein, said expansion lock means comprises a tie bar means for extending between corresponding elongated members on said first and said second expansion links.

7. The expansion trailer hitch of claim 5 wherein, said expansion lock means comprises an expansion bar means for connection between said first and said second member in the extended position of said expansion links.

8. The expansion trailer hitch of claim 4 wherein, said hitch ball mounting means comprises means for mounting a caster wheel.

9. The expansion trailer hitch of claim 8 wherein, said caster wheel is mounted substantially directly below said hitch ball.

10. The expansion trailer hitch of claim 4 wherein, towing lock means for retaining said first and second expansion links in said normal position comprises cooperating lock means on said tie bar means and on said hitch ball mounting means.

11. The expansion hitch of claim 4 wherein, said link hinge means includes means for preventing movement of said elongated members beyond the position where they are substantially aligned.

* * * * *